(No Model.)

J. POTTER.
BOLT.

No. 376,258. Patented Jan. 10, 1888.

WITNESSES:
Chas. Nida
C. Sedgwick

INVENTOR:
J. Potter
BY Munn & Co
ATTORNEYS.

UNITED STATES PATENT OFFICE.

JONAS POTTER, OF MORRELLVILLE, PENNSYLVANIA, ASSIGNOR TO HIMSELF AND JACOB J. STRAYER, OF SAME PLACE.

BOLT.

SPECIFICATION forming part of Letters Patent No. 376,258, dated January 10, 1888.

Application filed March 22, 1887. Renewed December 1, 1887. Serial No. 256,656. (No model.)

*To all whom it may concern:*

Be it known that I, JONAS POTTER, of Morrellville, in the county of Cambria and State of Pennsylvania, have invented a new and Improved Spring-Bolt, of which the following is a full, clear, and exact description.

My invention relates to an improvement in spring-bolts, and has for its object to dispense with the use of cotter-pins or nuts in retaining a bolt in a given position and wherein the bolt may be quickly and easily detached even though badly rusted.

The invention consists in providing a bolt with a spring-yoke connection, and in the combination and construction of the said yoke and bolt, together with means for detaching the bolt from its connection, as will be hereinafter fully set forth, and pointed out in the claims.

Reference is to be had to the accompanying drawings, forming a part of this specification, in which similar letters of reference indicate corresponding parts in all the figures.

Figure 1:
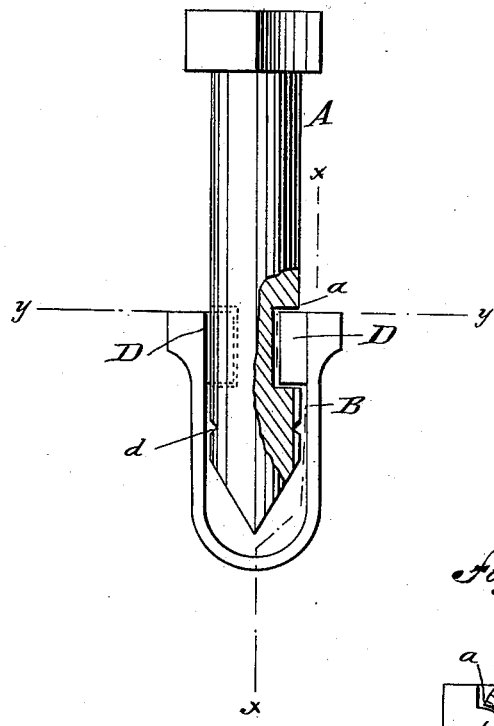
Figure 2:
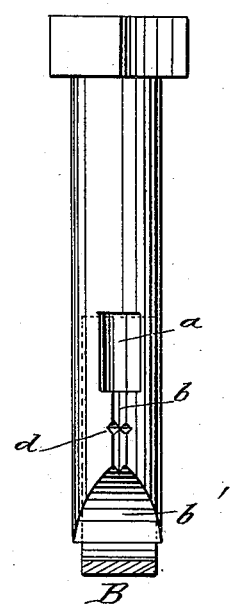
Figure 3:
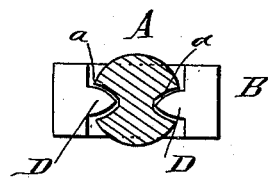
Figure 4:
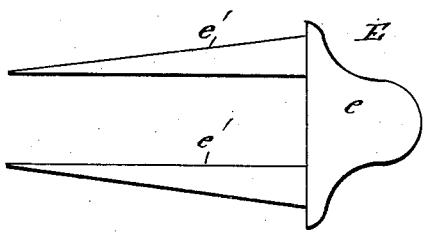
Figure 5:
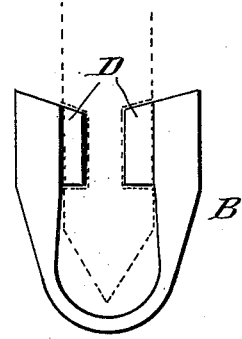

Figure 1 is a side elevation of the device, partly in section; and Fig. 2, a side elevation at right angles to Fig. 1, parts being shown in section on the line $x\,x$ of Fig. 1; Fig. 3, a horizontal section through line $y\,y$ of Fig. 1; Fig. 4, a side elevation of the detacher; and Fig. 5 is a side elevation of a modified form of yoke.

In carrying the invention into effect the bolt A is provided with recesses $a$ upon opposite sides near the bottom and longitudinal grooves $b$, extending from the lower central portion of the said recesses, preferably, to the lower end of the bolt, although when the said lower end is made wedge-shaped, as shown in the drawings, the grooves $b$ may terminate at the commencement of the incline $b'$. Below each recess $a$, and comparatively near thereto, a transverse or horizontal groove, $d$, is located, as shown in Fig. 2.

As a substitute for the nut commonly used, a yoke, B, is provided, preferably made U-shaped, as shown in Fig. 1, constructed from spring metal, and with lugs D, integral with the inner, upper, and opposing sides, which lugs are made more or less sharp upon their outer longitudinal edges and are adapted to enter the recesses $a$ of the bolt. In practice the yoke B may be attached to or made a portion of the special part adapted for attachment by the bolt D.

In operation the wedge end of the bolt is placed in contact with the yoke, the upper edges of the lugs D being made to engage the lower ends of longitudinal grooves $b$ by striking the head of the bolt a blow with a hammer. The said bolt is driven within the yoke and so guided that the lugs D will enter the recesses $a$, whereupon a rigid and secure connection is effected.

When it is desirous to release the bolt, a detacher, E, is employed, consisting of the handle or body $e$, provided with spaced aligning and integral arms $e'$, the outer longitudinal sides of which arms are made to taper in more or less wedge fashion from the outer ends to the handle. The thin ends of the arms $e'$ enter the transverse grooves $d$ of the bolt, and the handle is thereupon struck with a hammer or other instrument, whereby the detacher is driven into the yoke, expanding the same. The bolt may then be withdrawn without trouble.

In the yoke illustrated in Fig. 5, the upper edges thereof and the lugs D are beveled inward. By this construction the spring-yoke will continually force itself inward and compensate for wear.

Having thus described my invention, what I claim as new, and desire to secure by Letters Patent, is—

1. The combination, with a bolt, of a spring-yoke adapted to detachably clamp the sides of said bolt, substantially as herein shown and described.

2. The combination, with a bolt having recessed sides, of a spring-yoke provided with lugs adapted to enter the recesses of the bolt, substantially as set forth.

3. The combination, with a bolt having recessed sides and grooves extending longitudinally of its lower end intersecting said recesses, of a spring-yoke provided with lugs integral with the outer ends of its members, substantially as set forth.

4. The combination, with a bolt having recessed sides and grooves extending longitudinally of its lower end intersecting said recesses and transverse grooves between said recesses and the lower ends of the said bolt, of a U spring-yoke provided with lugs integral with the outer ends of its members, adapted to enter said recesses, substantially as set forth.

JONAS POTTER.

Witnesses:
 I. E. ROBERTS,
 W. R. JOHNSON.